United States Patent
Goforth et al.

(10) Patent No.: US 12,223,674 B2
(45) Date of Patent: *Feb. 11, 2025

(54) METHODS AND SYSTEMS FOR JOINT POSE AND SHAPE ESTIMATION OF OBJECTS FROM SENSOR DATA

(71) Applicant: Argo AI, LLC, Pittsburgh, PA (US)

(72) Inventors: Hunter Goforth, Sunnyvale, CA (US); Xiaoyan Hu, Redmond, WA (US); Michael Happold, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/318,771

(22) Filed: May 17, 2023

(65) Prior Publication Data
US 2023/0289999 A1 Sep. 14, 2023

Related U.S. Application Data

(63) Continuation of application No. 16/885,743, filed on May 28, 2020, now Pat. No. 11,694,356.
(Continued)

(51) Int. Cl.
*G06T 7/00* (2017.01)
*B60W 30/09* (2012.01)
(Continued)

(52) U.S. Cl.
CPC ............. *G06T 7/73* (2017.01); *B60W 30/09* (2013.01); *B60W 30/0956* (2013.01);
(Continued)

(58) Field of Classification Search
CPC .. G06V 20/58; G06T 7/50; G06T 7/70; G06T 7/60; G06T 2207/10028;
(Continued)

(56) References Cited

U.S. PATENT DOCUMENTS

| | | | |
|---|---|---|---|
| 2019/0004533 A1* | 1/2019 | Huang | G01S 17/86 |
| 2019/0205606 A1 | 7/2019 | Zhou et al. | |
| 2020/0310370 A1* | 10/2020 | Bogo | G05B 13/0265 |

FOREIGN PATENT DOCUMENTS

| | | |
|---|---|---|
| KR | 20190124113 A | 11/2019 |
| WO | 2019023628 A1 | 1/2019 |

OTHER PUBLICATIONS

Yuan, W. et al., "PCN: Point Completion Network", arXiv:1808.00671v3 [cs.CV] Sep. 26, 2019.
(Continued)

*Primary Examiner* — Tiffany P Young
(74) *Attorney, Agent, or Firm* — Fox Rothschild LLP

(57) ABSTRACT

Methods and systems for jointly estimating a pose and a shape of an object perceived by an autonomous vehicle are described. The system includes data and program code collectively defining a neural network which has been trained to jointly estimate a pose and a shape of a plurality of objects from incomplete point cloud data. The neural network includes a trained shared encoder neural network, a trained pose decoder neural network, and a trained shape decoder neural network. The method includes receiving an incomplete point cloud representation of an object, inputting the point cloud data into the trained shared encoder, outputting a code representative of the point cloud data. The method also includes generating an estimated pose and shape of the object based on the code. The pose includes at least a heading or a translation and the shape includes a denser point cloud representation of the object.

20 Claims, 7 Drawing Sheets

Related U.S. Application Data

(60) Provisional application No. 62/935,958, filed on Nov. 15, 2019.

(51) Int. Cl.

| | | |
|---|---|---|
| *B60W 30/095* | (2012.01) | |
| *B60W 60/00* | (2020.01) | |
| *G06N 3/045* | (2023.01) | |
| *G06N 3/088* | (2023.01) | |
| *G06T 7/50* | (2017.01) | |
| *G06T 7/60* | (2017.01) | |
| *G06T 7/70* | (2017.01) | |
| *G06T 7/73* | (2017.01) | |
| *G06V 10/20* | (2022.01) | |
| *G06V 10/24* | (2022.01) | |
| *G06V 10/74* | (2022.01) | |
| *G06V 10/82* | (2022.01) | |
| *G06V 20/58* | (2022.01) | |
| *G06V 20/64* | (2022.01) | |

(52) U.S. Cl.
CPC .... *B60W 60/0016* (2020.02); *B60W 60/0027* (2020.02); *G06N 3/045* (2023.01); *G06N 3/088* (2013.01); *G06T 7/50* (2017.01); *G06T 7/60* (2013.01); *G06T 7/70* (2017.01); *G06V 10/242* (2022.01); *G06V 10/255* (2022.01); *G06V 10/761* (2022.01); *G06V 10/82* (2022.01); *G06V 20/58* (2022.01); *G06V 20/64* (2022.01); *B60W 2420/403* (2013.01); *B60W 2420/408* (2024.01); *G06T 2207/10028* (2013.01); *G06T 2207/20081* (2013.01); *G06T 2207/20084* (2013.01); *G06T 2207/30244* (2013.01); *G06T 2207/30261* (2013.01)

(58) Field of Classification Search
CPC . G06T 2207/20081; G06T 2207/20084; G06T 2207/30244; G06T 2207/30261; B60W 60/0016; B60W 60/0027; B60W 30/09; B60W 30/0956; B60W 2420/42; B60W 2420/52; G06N 3/0454; G06N 3/088
USPC .......................................................... 701/26
See application file for complete search history.

(56) References Cited

OTHER PUBLICATIONS

Ding, W. et al., "Vehicle Three-Dimensional Pose and Shape Estimation from Multiple Monocular Vision," 2018 IEEE International Conference on Robotics and Biomimetics (ROBIO), Feb. 10, 2018, pp. 1-8.

Qi, C. et al., "PointNet: Deep Learning on Point sets for 3D Classification and Segmentation," Proceedings of the IEEE Conference on Computer Vision and Pattern Recognition (CVPR), Dec. 2016, pp. 1-19.

Goforth, H. et al., "Joint Pose and Shape Estimation of Vehicles from LiDAR Data," Sep. 2020, pp. 1-10.

International Search Report and Written Opinion for PCT/US2020/057324 dated Feb. 17, 2021.

Yuan et al., "PCN: Point Completion Network", 2018 International Conference on 3D Vision (3DV), IEEE, pp. 728-737.

Chen et al., "SO-HandNet: Self-Organizing Network for 3D Hand Pose Estimation With Semi-Supervised Learning", 2019 IEEE/CVF International Conference on Computer Vision (ICCV), IEEE, pp. 6960-6969.

Henderson et al., "Learning Single-Image 3D Reconstruction by Generative Modelling of Shape, Pose and Shading", ARSIV.org, Cornell University Library (2019), 128(4): 835-854.

Engelmann et al., "Joint Object Pose Estimation and Shape Reconstruction in Urban Street Scene Using 3D Shape Priors", Sat 2015 18th International Conference, Austin, TX (2016), Lecture Noted in Computer Science, pp. 219-230.

* cited by examiner

METHODS AND SYSTEMS FOR JOINT POSE AND SHAPE ESTIMATION OF OBJECTS FROM SENSOR DATA

RELATED APPLICATIONS AND CLAIMS OF PRIORITY

The present application is a continuation of and claims priority to U.S. patent application Ser. No. 16/885,743 filed May 28, 2020, which claims priority from U.S. Patent Application No. 62/935,958 filed Nov. 15, 2019, the disclosures of both are incorporated herein by reference in their entirety.

BACKGROUND

The ability to accurately estimate the pose (three-dimensional position and orientation) and shape of an object in their environment is one of the fundamental problems for intelligent robots such as autonomous vehicles to perform dependable tasks. In an autonomous mode, a vehicle navigates through an environment with little or no input from a driver. Therefore, successful design and deployment of autonomous vehicles requires the ability to accurately perceive objects in the autonomous vehicle's environment because control decisions must be made with respect to such objects. Objects may include stationary or moving vehicles, objects, people, etc. in the environment of the autonomous vehicle.

Such an autonomous vehicle typically includes one or more laser detection and ranging (LIDAR) systems that are configured to sense information about the objects in the environment of the autonomous vehicle. Often information sensed by the LIDAR systems about an agent is incomplete because of, for example, occlusions between a LIDAR system and the perceived object, the type of object (e.g., specular objects), limitations of the LIDAR systems, etc. Therefore, a full 3D shape of the perceived object must be accurately estimated from the incomplete LIDAR information. Furthermore, existing pose estimation methods require assuming a known 3D shape of the perceived object against which a partial measurement can be matched and aligned. Additionally, such methods for estimating the pose of an unknown object of a known class (e.g., a class including cars) requires knowledge of a "canonical" orientation of a class, which is often inaccurate or unavailable.

Existing methods for performing pose estimation and shape completion do so sequentially (pose estimation followed by shape completion), and in isolation from each other. As such, any mistake in pose estimation is propagated to the shape completion stage leading to errors in the resultant shape as well. This also leads to runtime inefficiency.

This document describes methods and systems that are directed to addressing the problems described above, and/or other issues.

SUMMARY

In one or more scenarios, methods and systems for jointly estimating a pose and a shape of an object perceived by an autonomous vehicle are described. The system may include a processor and a non-transitory computer readable medium for storing data and program code collectively defining a neural network which has been trained to jointly estimate a pose and a shape of a plurality of objects from incomplete point cloud data. The neural network may include a trained shared encoder neural network, a trained pose decoder neural network, and a trained shape decoder neural network. The non-transitory computer readable medium may also include programming instructions that when executed cause the processor to execute the methods for jointly estimating a pose and a shape of an object. The method may include receiving point cloud data corresponding to the object that is an incomplete point cloud representation of the object and generating by the trained shared encoder of the neural network a code representative of the point cloud data. The is configured to be used for estimating both a pose and a shape of the object. The method may further include using the code to generate an estimated pose of the object from trained pose decoder and generate an estimated shape of the object from the trained shape encoder. The estimated pose may include at least a heading or a translation of the object. The estimated shape may include an estimated point cloud representation of the object that is denser than the incomplete point cloud representation of the object. Optionally, the incomplete point cloud data may be generated by a LIDAR sensor (e.g., mounted on the autonomous vehicle).

In certain embodiments, the point cloud data may be collected by an autonomous vehicle during navigation. The method may also include using the estimated shape and the estimated pose of the object to forecast a trajectory of the object in an environment of the autonomous vehicle, and subsequently causing the autonomous vehicle to take an action to avoid colliding with the object based on the forecasted trajectory.

In at least one embodiment, the code may be a lower dimensional representation of the point could data comprising a feature vector derived from the point cloud data.

In some scenarios, the method may also include generating the neural network trained to jointly estimating the pose and the shape of the plurality of objects by receiving training data comprising partial point cloud data and ground truth data corresponding to one or more objects and generating the trained shared encoder and the trained shape decoder by using the training data to collectively train a shared encoder neural network and a shape decoder neural network, wherein the trained shared encoder and the trained shared decoder are configured to estimate the shape of the plurality of objects. Optionally, a loss function that minimizes a distance between estimated shape completion and ground truth shape completion (e.g., a Chamfer Distance loss function) may be used to constrain training of the shared encoder neural network and the shape decoder neural network, wherein the loss function. The method may also include generating a trained pose decoder by using one or more codes generated by the trained shared encoder to train a pose decoder neural network while freezing one or more parameters associated with the trained shared encoder. Optionally, a pose loss function that minimizes a distance between estimated point pose and ground truth pose may be used to constrain training of the pose decoder neural network. The neural network comprising the trained shared encoder neural network, the trained pose decoder neural network, and the trained shape decoder neural network may be outputted for storage, future use, further training, etc. In some embodiments, the trained neural network may be fine-tuned or further trained by jointly or collectively training the shared encoder, the trained shape decoder, and the trained pose decoder to generate an updated trained neural network. Such collective training may be constrained by a joint loss function that includes a shape loss function and a pose loss function. Optionally, the training data may include synthetic data generated using simulation.

In one or more embodiments, the trained shared encoder may include at least two deep network layers, each of the two deep network layers comprising a multilayer.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An autonomous vehicle operating on a road needs to identify objects (e.g., other vehicles, people, obstacles, etc.) in the environment of the vehicle to determine a safe trajectory for navigation. The autonomous vehicle may also determine or estimate one or more features or properties of such objects (e.g., pose and shape) for a safe control and navigation strategy. The methods and systems of the present disclosure may be used to perform joint pose estimation and shape completion of objects in the environment of the autonomous vehicle based on LIDAR data. The disclosure describes systems that learn to understand the "canonical" orientation of an object class (e.g., a "forward" direction for a vehicle), and do not require a known 3D shape. It should be noted that while the current disclosure describes performing pose estimation and shape completion of vehicles in the environment of an autonomous vehicle using LIDAR data, the disclosure is not so limiting. The systems and methods of this disclosure may be used for pose estimation and shape completion of other objects and/or using data collected by other sensor systems such as, without limitation, cameras, RADAR, or the like.

Figure 1:
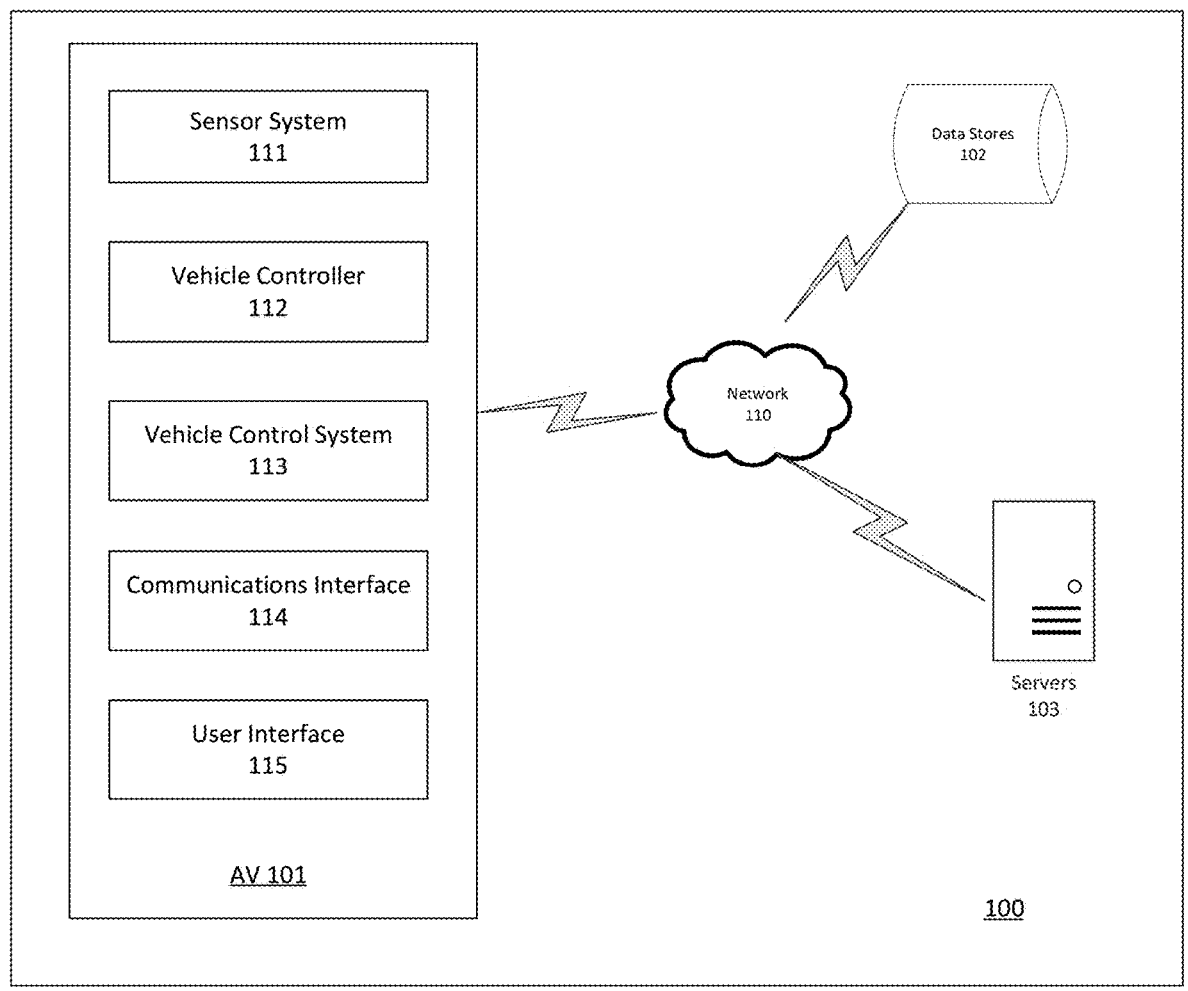
FIG. 1 illustrates an example system that includes an autonomous vehicle.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), traffic information data store(s), user information data store (s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, a vehicle controller 112, a vehicle control system 113, a communications interface 114, and a user interface 115. Autonomous vehicle 101 may further include certain components (not shown here) included in vehicles, such as, an engine, wheels, steering wheel, transmission, etc., which may be controlled by vehicle control system 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a LIDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like. As autonomous vehicle 101 travels over a surface, at least some of the sensors may collect data pertaining to the surface.

The LIDAR system may include a sensor configured to sense or detect objects in an environment in which the autonomous vehicle 101 is located. Generally, LIDAR system is a device that incorporates optical remote sensing technology that can measure distance to a target and/or other properties of a target (e.g., a ground surface) by illuminating the target with light. As an example, the LIDAR system may include a laser source and/or laser scanner configured to emit laser pulses and a detector configured to receive reflections of the laser pulses. For example, the LIDAR system may include a laser range finder reflected by a rotating mirror, and the laser is scanned around a scene being digitized, in one, two, or more dimensions, gathering distance measurements at specified angle intervals. The LIDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LIDAR system may be coupled to the first vehicle to scan a complete 360° horizon of the first vehicle. The LIDAR system may be configured to provide to the computing device a cloud of point data representing the surface(s), which have been hit by the laser. The points may be represented by the LIDAR system in terms of azimuth and elevation angles, in addition to range, which can be converted to (X, Y, Z) point data relative to a local coordinate frame attached to the vehicle. Additionally, the LIDAR may be configured to provide intensity values of the light or laser reflected off the surfaces that may be indicative of a surface type. In examples, the LIDAR system may include components such as light (e.g., laser) source, scanner and optics, photo-detector and receiver electronics, and position and navigation system. In an example, The LIDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LIDAR systems for collecting data pertaining to the surface may be included in systems other than the autonomous vehicle 101 such as, without limitation, other vehicles (autonomous or driven), robots, satellites, etc.

Figure 2:
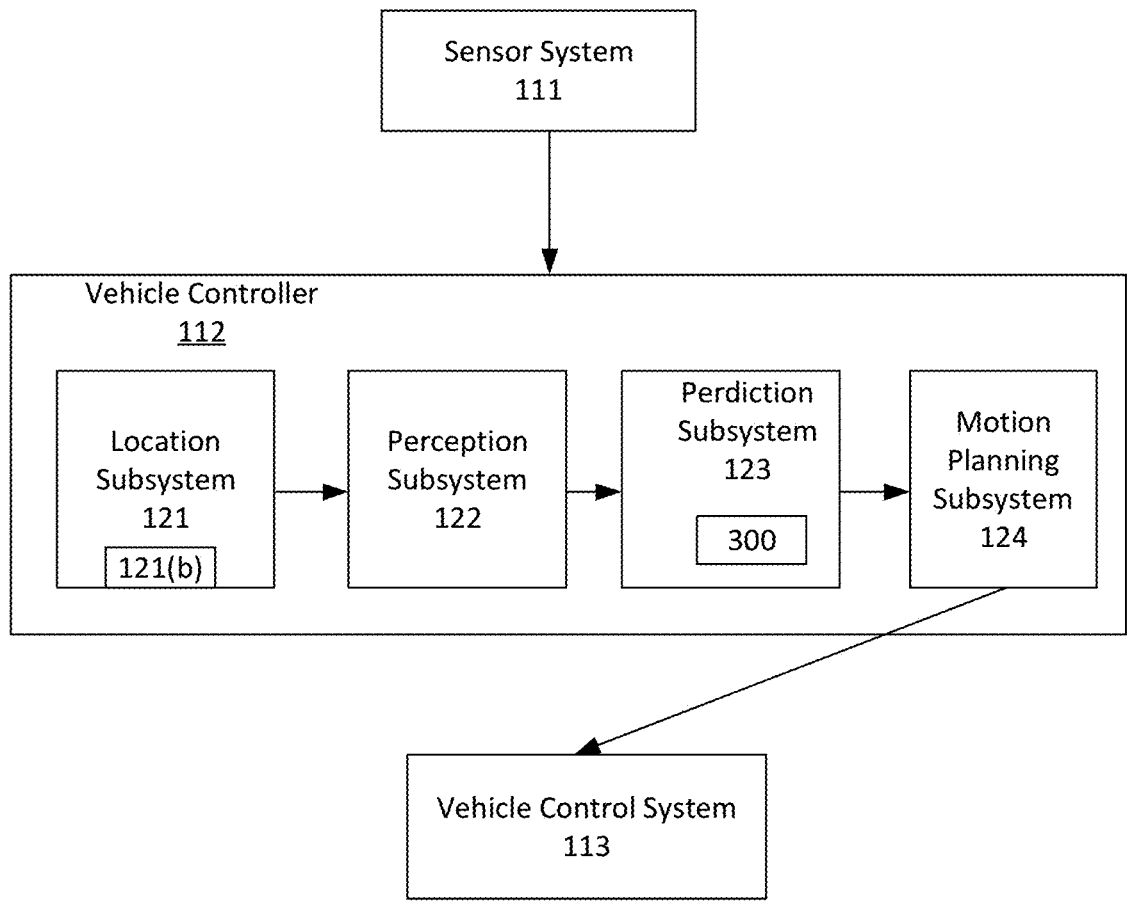
FIG. 2 illustrates a block diagram of various components of an example controller of an autonomous vehicle.

Referring now to FIG. 2, the vehicle controller 112 may receive data collected by the sensor system 111 and analyze it to provide one or more vehicle control instructions to the vehicle control system 113. The vehicle controller 112 may include, without limitation, a location subsystem 121, a perception subsystem 122, a forecasting and prediction subsystem 123, and a motion planning subsystem 124. The components of the vehicle controller 112 (a location subsystem 121, a perception subsystem 122, a forecasting and prediction subsystem 123, and a motion planning subsystem 124) may be a processing device and programming instructions that are configured to cause the processing device to perform the functions of the subsystems as described in this document. While the current disclosure shows the components as separate parts of the controller 112, two or more of the subsystems may share a single processing device.

A location subsystem 121 may obtain, retrieve, and/or create map data that provides detailed information about the surrounding environment of the autonomous vehicle. The location subsystem 121 may also determine the location, orientation, pose, etc. of the AV in the environment (localization) based on, for example, three dimensional position data (e.g., data from a GPS), three dimensional orientation data, predicted locations, or the like. For example, the location subsystem 121 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle controller 112 in analyzing the surrounding environment of the autonomous vehicle. In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the location subsystem 121 may also include and/or may receive information relating to the trip or route of a user, real-time traffic information on the route, or the like.

The location subsystem 121 may include and/or may be in communication with a routing module 121(b) that generates a navigation route from a start position to a destination position for an autonomous vehicle. The routing module 121(b) may access a map data store to identify possible routes and road segments that a vehicle can travel on to get from the start position to the destination position. The routing module 121(b) may score the possible routes and identify a preferred route to reach the destination. For example, the routing module 121(b) may generate a navigation route that minimizes Euclidean distance traveled or other cost function during the route, and may further access the traffic information and/or estimates that can affect an amount of time it will take to travel on a particular route. Depending on implementation, the routing module 112(b) may generate one or more routes using various routing methods, such as Dijkstra's algorithm, Bellman-Ford algorithm, or other algorithms. The routing module 121(b) may also use the traffic information to generate a navigation route that reflects expected conditions of the route (e.g., current day of the week or current time of day, etc.), such that a route generated for travel during rush-hour may differ from a route generated for travel late at night. The routing module 121(b) may also generate more than one navigation route to a destination and send more than one of these navigation routes to a user for selection by the user from among various possible routes.

A perception subsystem 122 may determine perception information of the surrounding environment of the autonomous vehicle. Based on the sensor data provided by sensor system 111 and information obtained by the location subsystem 121, the perception subsystem 122 may determine perception information of the surrounding environment of the autonomous vehicle 101. The perception information may represent what an ordinary driver would perceive in the surrounding environment of a vehicle. The perception data may include information relating to one or more objects in the environment of the autonomous vehicle 101. For example, the perception subsystem 122 may process sensor data (e.g., LIDAR or RADAR data, camera images, etc.) in order to identify objects and/or features in the environment of autonomous vehicle. The objects may include traffic signals, road way boundaries, other vehicles, pedestrians, and/or obstacles, etc. The perception subsystem 122 may use any now or hereafter known object recognition algorithms, video tracking algorithms, and computer vision algorithms (e.g., track objects frame-to-frame iteratively over a number of time periods) to determine the perception.

In some embodiments, the perception subsystem 122 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

As discussed below, the perception subsystem 122 may perform joint pose estimation and shape completion using a neural network of FIG. 3.

A prediction subsystem 123 may predict future locations, trajectories, and/or actions of one or more objects. For example, the prediction subsystem 123 may predict the future locations, trajectories, and/or actions of the objects based at least in part on perception information (e.g., the state data for each object comprising an estimated shape and pose determined as discussed below) received from the perception subsystem 122, the location information received from the location subsystem 121, the sensor data, and/or any other data that describes the past and/or current state of the objects, the autonomous vehicle 101, the surrounding environment, and/or their relationship(s). For example, if an object is a vehicle and the current driving environment includes an intersection, prediction subsystem 123 may predict whether the object will likely move straight forward or make a turn. If the perception data indicates that the intersection has no traffic light, prediction subsystem 123 may also predict whether the vehicle may have to fully stop prior to enter the intersection.

A motion planning subsystem 124 may determine a motion plan for the autonomous vehicle. For example, the motion planning subsystem 124 may determine a motion plan for the autonomous vehicle based on the perception data and/or the prediction data. Specifically, given predictions about the future locations of proximate objects and other perception data, the motion planning subsystem 124 can determine a motion plan for the autonomous vehicle 101 that best navigates the autonomous vehicle 101 relative to the objects at their future locations.

In one or more embodiments, the motion planning subsystem 124 may receive the predictions from the prediction subsystem 123 and make a decision regarding how to handle objects in the environment of the autonomous vehicle 101. For example, for a particular object (e.g., a vehicle with a given speed, direction, turning angle, etc.), motion planning subsystem 124 decides whether to overtake, yield, stop, and/or pass based on, for example, traffic conditions, map data, state of the autonomous vehicle, etc. Furthermore, the motion planning subsystem also plans a path for the autonomous vehicle 101 to travel on a given route, as well as driving parameters (e.g., distance, speed, and/or turning angle). That is, for a given object, the motion planning subsystem 124 decides what to do with the object and determines how to do it. For example, for a given object, the motion planning subsystem 124 may decide to pass the object and may determine whether to pass on the left side or right side of the object (including motion parameters such as speed). The motion planning subsystem 124 may also assess the risk of a collision between a detected object and the autonomous vehicle 101. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the controller 120 may transmit appropriate control instructions to the vehicle control system 113 for execution to perform a cautious maneuver (e.g., mildly slow down, accelerate, change lane, or swerve). In contrast, if the collision cannot be avoided, then the controller 120 may transmit appropriate control instructions to the vehicle control system 113 for execution of an emergency maneuver (e.g., brake and/or change direction of travel).

As discussed above, planning and control data regarding the movement of the autonomous vehicle is generated by the motion planning subsystem 124 of the controller 120 that is transmitted to the vehicle control system 113 for execution. The vehicle control system 113 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the controller to make decisions and use the decisions to control operations of one or more vehicle systems via the vehicle control system of the vehicle. However, the embodiments are not limited to this arrangement, as in various embodiments the analysis, decision making and or operational control may be handled in full or in part by other computing devices that are in electronic communication with the vehicle's on-board controller and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 113 may be part of peripheral devices implemented within vehicle 101 including, for example, a keyword, a touch screen display device, a microphone, and a speaker, etc.

Figure 3:
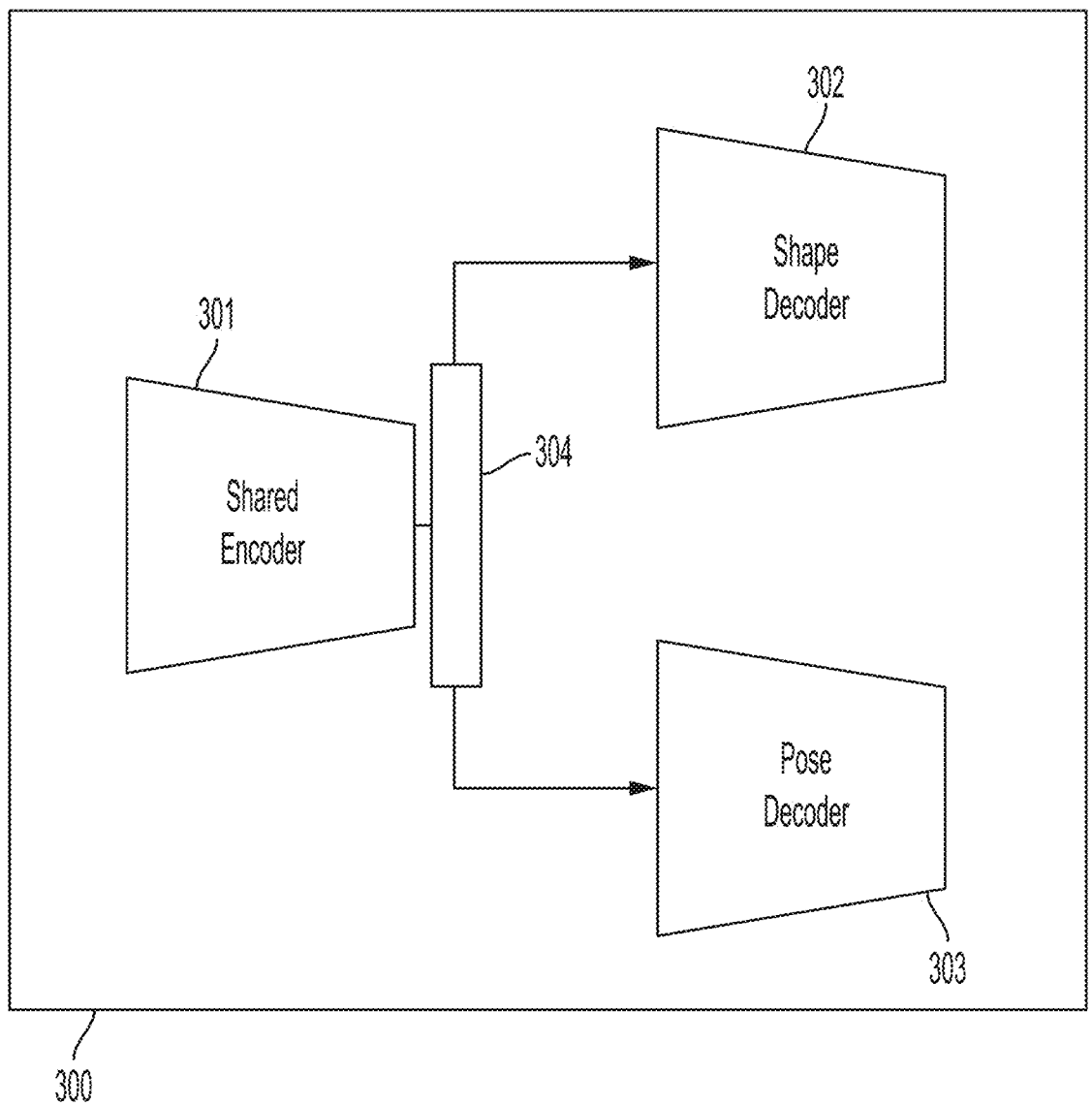
FIG. 3 is a schematic illustration of an example neural network for jointly estimating pose and shape of an object.

Referring now to FIG. 3, a schematic illustration of an example neural network 300 for jointly estimating pose and shape of an object from point cloud data (e.g., LIDAR data) is shown. The neural network 300 may be an encoder-decoder type neural network that may include a shared encoder 301 shared by two decoders—a shape decoder 302 and a pose decoder 303. The shared encoder 301, shape decoder 302, and/or pose decoder 303 may each be associated with individual weights or parameters. In a typical encoder-decoder network, an encoder can encode an input data point as a latent variable from which a latent representation may be sampled, and a decoder in turn can decode a latent representation to generate a random variable from which a reconstruction of the original input may be sampled. The random variable may be modeled by a probability distribution, for example a Normal distribution, Laplace distribution, Elliptical distribution, Student's t distribution, Logistic distribution, Uniform distribution, Triangular distribution, Exponential distribution, Invertible cumulative distribution, Cauchy distribution, Rayleigh distribution, Pareto distribution, Waybill distribution, Reciprocal distribution, Gompertz distribution, Gumbel distribution, Erlan distribution, Logarithmic Normal distribution, Gamma distribution, Dirichlet distribution, Beta distribution, Chi-Squared distribution, or F distribution, or variations thereof.

Typically, the dimensionalities of the input data and the output reconstructions can be the same. The shared encoder 301 of the current disclosure encodes input point cloud data as a latent variable from which a latent representation of both shape and pose may be sampled (discussed below). The shape decoder 302 can decode a latent representation to generate a random variable from which a shape reconstruction of the original input may be sampled, and the pose decoder 303 can decode a latent representation to generate a random variable from which a pose reconstruction of the original input may be sampled, as discussed below.

The shared encoder 301 may include a neural network model (i.e., artificial neural network architectures such as e.g., feed-forward neural networks, recurrent neural networks, convolutional neural networks, or the like) that is trained or configured to receive sensor data (e.g., a LIDAR point cloud) corresponding to an object as an input, and generate an output that comprises an encoded or alternative representation of the input 304 (a "code"). Optionally, the code may be a lower dimensional representation of the input point cloud data, and that include defined values of latent variables that each represent a feature of the point cloud (in particular, shape features and/or pose features). The code may include states or feature maps in a vector form or a tensor form corresponding to the received input. The code 304 may serve as a context or conditioning input for the shape decoder 302 and/or the pose decoder 303 for generating outputs including an estimated shape and an estimated pose, respectively, corresponding to the input sensor data. Optionally, the shape decoder 302 and/or the pose decoder 303 may be neural network models (i.e., artificial neural network architectures such as e.g., feed-forward neural network, recurrent neural network, convolutional neural network, or the like). In certain scenarios, the shared encoder 301, the shape decode 302 and/or the pose decoder 303 may be embodied as a multi-layer perceptron (MLP) comprising at least 2, 3, 4, 5, 6, 7, 8, 9, 10, 11, 12, or more hidden layers, and may utilize any suitable learning algorithm described herein or otherwise known in the art. In a MLP, each node is a feed-forward node, with a number of inputs, a number of weights, a summation point, a non-linear function, and an output port. Each input at an input port is multiplied by the value of the corresponding weight, and the weighted values are summed. In other words, the input vector is multiplied by the weight vector to form a scalar product. The sum is then fed through a non-linear function (typically a sigmoid function) and passed to the output port. In a MLP, at least two layers are present, so that the output ports of the first layer are connected to the input ports of a second layer.

As shown in FIG. 3, the shape decoder 302 and the pose decoder 303 share an encoder 301, where the code generated by the shared encoder 301 is used to predict both shape and pose, reducing redundancy while providing stable pose and shape estimations. Training the shared encoder 301 may be performed by first training the encoder 301 for shape completion, followed training the pose decoder 303 on codes produced by a frozen encoder 301 (discussed below). The neural network 300 performance for joint shape and pose estimation may further be improved by fine-tuning using a joint pose and shape loss.

In one or more embodiments, the shared encoder 301 may generate an encoded version (i.e., code) of the geometric information contained within the input point cloud as a feature vector $v \in R^k$ (where, R is any real number and k is a value greater than zero, preferably on the order of 1000 such as, for example, 1000, 1024, 1096, 2000, etc.). The shared encoder 301 may include two deep network layers (e.g., POINT NET layers). The first layer may use m input points represented as an m×3 matrix P where each row is the 3D coordinate of a point $p_i=(x, y, z)$. A shared multilayer perceptron (MLP) consisting of two linear layers with ReLU activation may then be used to transform each $p_i$ into a point feature vector $f_i$ to generate a feature matrix F whose rows are the learned point features $f_i$. Then, a point-wise max pooling may be performed on F to obtain a k-dimensional global feature g, where $g_j=\max_{i=1,\ldots,m}\{F_{ij}\}$ for $j=1,\ldots,k$. The second deep network layer of the shared encoder 301 may use F and g as input and concatenate g to each $f_i$ to obtain an augmented point feature matrix $F_1$ whose rows are the concatenated feature vectors $[f_i\ g]$. $F_1$ may be passed through another shared MLP and point-wise max pooling similar to the ones in the first layer, which gives the final feature vector v. One or more of such deep network layers may be used in the shared encoder 301 without deviating from the principles of this disclosure. In certain embodiments, the shared MLP in the first layer may have 2 layers with 128 and 256 units, respectively, and the shared MLP in the second layer may have 2 layers with 512 and 1024 units, respectively.

In certain embodiments, the shape decoder 302 may generate an output point cloud corresponding to an estimated shape of an object from the feature vector v. The shape decoder 302 may generate the output point cloud in two stages. In the first stage, a coarse output $Y_{coarse}$ of s points may be generated by passing v through a fully-connected network with 3s output units and reshaping the output into an s×3 matrix. In the second stage, for each point $q_i$ in $Y_{coarse}$, a patch of $t=u^2$ points may be generated in local coordinates centered at $q_i$ via a folding operation, and transformed into global coordinates by adding $q_i$ to the output. Combining all s patches gives the detailed output $Y_{detail}$ consisting of n=st points. This multistage process allows the decoder network to generate a dense output point cloud corresponding to the estimated shape with fewer parameters and more flexibility. In certain embodiments, the shape decoder 302 may include 3 fully connected layers with 1024, 1024, and 1024.3 units followed by one folding layer (3-layer shared MLP with 512, 512 and 3 units).

In certain embodiments, the pose decoder 303 may generate an output comprising at least a heading (θ) and/or a translation (x, y) corresponding to an estimated pose of an object from the feature vector v. The pose decoder may include an MLP comprising 3 layers with 1024, 512, and 512.3 units.

Use of a shared encoder 301 allows for training of the neural network 300 using training data that is not canonically aligned (i.e., for which pose is unknown) even if the training data includes partial observations (i.e., incomplete point clouds). The code generated by the shared encoder 301 may be used to estimate both the pose and the complete shape from the partial input data, avoiding the redundancy of encoding the partial input twice.

It should be noted that while the above disclosure describes the use of POINT NET layers and algorithms in the encoder, shape decoder and/the pose decoder, the disclosure is not so limiting. Other point-cloud based neural network models such as, without limitations, dynamic graph convolutional neural networks, VOXELNET, neural 3D mesh renderer, point convolutional neural networks, octree based convolutional neural networks, or the like.

The current disclosure describes systems and methods for using neural network 300 for improving shape and pose estimation based on LIDAR data, and therefore improving perception, as described below. The neural network 300 may be included in the perception subsystem 122. Furthermore, the neural network 300 may be implemented in two phases: a training phase (offline and/or real-time) and an operational phase. The training phase is used to train and configure the parameters of the neural network 300 and the operational phase is used after the neural network 300 has been trained and is ready to support the generation of perception data including shape and pose estimation of perceived objects as described in more detail below. In certain embodiments, the neural network 300 may initially be trained at a server system outside the autonomous vehicle 101 and the trained neural network may be transmitted for storage in the perception subsystem 122. Alternatively, the neural network 300 may be trained and stored outside the autonomous vehicle 101. In yet another embodiment, the neural network 300 may be trained and stored on board the autonomous vehicle 101.

Figure 4:
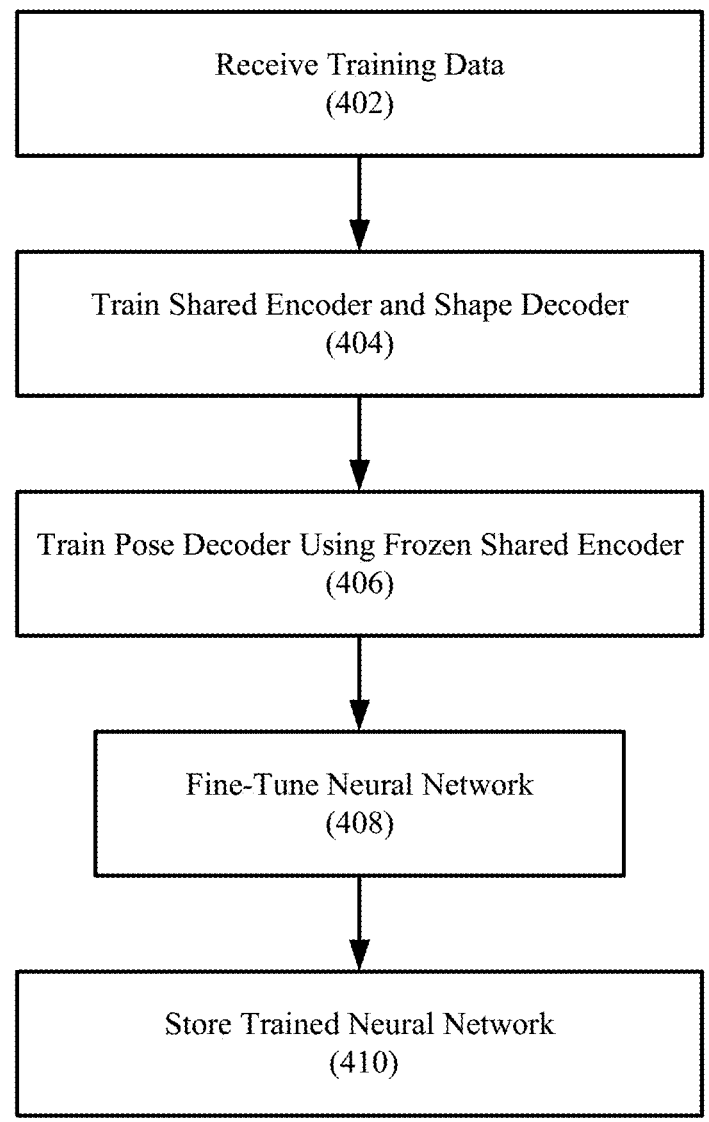
FIG. 4 illustrates a flowchart for an example method of training the neural network of FIG. 3.

FIG. 4 is a flowchart illustrating an example method for training the neural network 300 of FIG. 3.

At step 402, the system may receive or collect training data including sensor data corresponding to one or more objects (in their respective states) in one or more environments from a library, human driving database, simulated data collection systems, real-time data corresponding to various scenarios and/or environments (e.g., data collected by information gathering devices installed in moving test vehicles being navigated through pre-defined routings in an environment or location of interest). The training data may include partial point cloud data and/or complete point cloud data corresponding to one or more objects. For training neural networks which estimate complete point clouds from partial observations (i.e., partial point cloud data), the training data should include many pairs of partial observations and complete ground truth.

In certain embodiments, training data may include accurately-simulated depth data. Such simulated training data may be obtained using a sensor model (e.g., VELODYNE) in a simulated environment to generate partial observations and/or complete observations of high-resolution CAD models of different types of vehicles. For partial observations, points from the surface of a plurality of CAD models may be sampled using the simulated sensor (at an appropriate height). The system may simulate vehicle poses at a distance from the simulated sensor (between about 4 to 40 meters, about 5 to 35 meters, about 6 to 30 meters, about 7 to 25 meters, or the like) with random headings uniformly sampled between 0 and 360 degrees. For collecting training data including complete observations (i.e., complete ground truth), methods such as uniform surface sampling of the CAD model using ray tracing to exterior surfaces may be used.

At 404, the system may use the training data to train the shared encoder and the shape decoder to perform completion of partial observations corresponding to a perceived object. The system may freeze the pose decoder weight (or parameters) and train only the shared encoder and the shape decoder on the partial observations included in the training data. Such freezing prevents the weights of the pose decoder from being modified during training of the shared encoder and the shape decoder. Optionally, the partial observations used for training in step 404 may be unaligned (i.e., their pose is unknown). Training may be performed by selecting a batch of training data and, for each partial observation in the training data, inputting the partial observation to the shared encoder and shape decoder to process the input observation with current parameter or weight values of the shared encoder and shape decoder. Training may further include updating the current parameters of the shared encoder and shape decoder based on an analysis of the output completed observation/shape with respect to the ground truth data.

In certain embodiments, the training may be constrained by a loss function. Specifically, the shared encoder and shape decoder may be trained to minimize or optimize a loss function between estimated point completion (i.e., shape estimation based on partial observations) and ground truth point completions (i.e., shape estimation based on complete observations). Examples of loss function may include, without limitation, Chamfer Distance, Earth Mover Distance, other distance metric functions, or the like, chosen based on the application and/or required correspondence with point cloud data points. Chamfer distance is a method for measuring total distance between two sets of 3D points. For example, Chamfer Distance loss function between estimated and ground truth point completions (i.e., shape estimation) may be represented as:

$$L_{CD}(X, \tilde{X}) = \frac{1}{|X|}\sum_{x \in X} \min y \in \tilde{X} \|x - y\|_2 + \frac{1}{|\tilde{X}|}\sum_{y \in \tilde{X}} \min x \in X \|y - x\|_2 \quad (1)$$

where, X is the ground truth completed point cloud and $\tilde{X}$ is the estimated completion. Such a Chamfer Distance loss function penalizes global structure instead of point density, and does not require on-to-one correspondence between points. Accuracy of global structure in the shape estimate is preferred in autonomous vehicle use cases. AS discussed above other loss functions are within the scope of this disclosure.

Thus, the encoder may learn to abstract each unaligned partial input into a fixed-length code which captures the object shape in such a way as that the complete shape can be recovered by the shape decoder conditioned on the code in the same (unknown) pose as the partial input.

At step 406, the system may train the pose decoder. Since the code generated by the shared encoder also capture information about poses, the code may be decoded by the pose decoder without retraining the shared encoder. As such, the system may freeze the weights (or parameters) of the shared encoder (as determined in step 404), and train the pose decoder to estimate poses of the partial observations or inputs using codes from the frozen shared encoder (i.e., frozen codes). Training may be performed as discussed above with respect to step 404. In certain embodiments, the training may be constrained by a pose loss function. Specifically, the pose may be trained to minimize or optimize a pose loss function between estimated pose and ground truth pose. In example embodiments, the pose loss function may be represented as:

$$L_P((R, t), (\tilde{R}, \tilde{t})) = \frac{1}{|X|}\sum_{x \in X}\|(Rx + t) - (\tilde{R}x + \tilde{t})\|_2^2 \quad (2)$$

where, (R, t) are the ground truth pose and ($\tilde{R}$, $\tilde{t}$) the estimated pose, and X the ground truth complete point cloud. The loss function of equation (2) accounts for rotation and translation equally without complicated weighting in the loss function. Other pose loss functions are within the scope of this disclosure. Such pose loss functions can combine translation and rotation in a combined loss term, and/or separate them and give different weight to each component (translation and rotation). Furthermore, pose error may be calculated using the point cloud information taking into account the number of points in the point cloud and shape of the cloud (as described above) or it may only be penalized in terms of the values of rotation and translation.

At step 408, the system may unfreeze all parts of the neural network (shared encoder, shape decoder, and pose decoder) and fine-tune all parts together using a joint loss function. Specifically, the neural network from step 406 may be trained again to minimize the joint loss function. The joint loss function may be combined loss including pose estimation loss and shape estimation loss (or completion loss). In certain embodiments, the joint loss function may be determined based on learned uncertainty-based weighting that avoids a parameter search for optimal multi-task weights. For example. The joint loss function may be represented as:

$$L_J(X, \tilde{X}, (R, t), (\tilde{R}, \tilde{t})) = \frac{1}{2\sigma_{CD}^2} L_{CD}(X, \tilde{X}) + \frac{1}{2\sigma_P^2} L_P((R, t), (\tilde{R}, \tilde{t})) + \log \sigma_{CD} \sigma_P \quad (3)$$

where, $\sigma_{CD}$ and $\sigma_P$ are learned parameters representing the uncertainty of the pose and shape predictions. A larger magnitude for these terms represents a greater uncertainty in the prediction, and thus a lowered weight for the particular loss term. The log term prevents the uncertainties from becoming too large. The equation (3) above is a specific form of a more general class of loss functions called multi-task loss functions (loss functions which target multiple objectives at once), and any other loss functions may be used without deviating from the principles of this disclosure. For example, manually-weighted loss terms with hyperparameter search for optimal weights may be used. Weights might also be updated during training based on other indicators besides uncertainty such as, for example, the current magnitudes of training gradients, the number of training steps taken, or the like.

At 410, the system may output or store the trained neural network. The trained neural network may be used for perception by an autonomous vehicle to estimate shape and/or poses of objects. The trained neural network is configured to share information between pose and shape estimation tasks leading to more accurate pose and shape estimations, and increased efficiency.

In certain embodiments, a trained neural network may be used for estimating pose and shape of different types/classes of objects (e.g., different vehicle classes). Alternatively and/or additionally, separate neural networks may be trained for individual object classes or types (e.g., vehicle classes such as small cars, large trucks, motorcycles, etc.).

It should be noted that while the neural network is trained on simulated or synthetic data using the methods described above, the trained neural network may be used in real-world scenarios without further processing.

Optionally, the training data may include real-world data collected using, for example sensors such as LIDAR sensors without deviating from the principles of this disclosure.

Figure 5A:
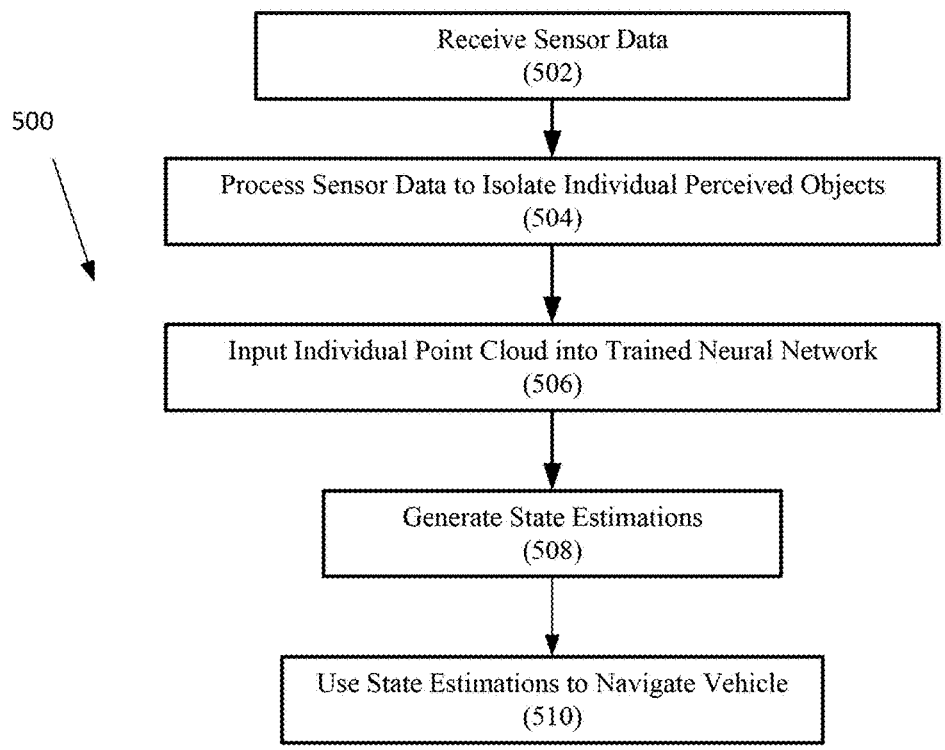
FIG. 5A illustrates a flowchart for an example method of using a trained neural network to generate pose and shape estimations for use in navigating an autonomous vehicle.

FIG. 5A illustrates a flowchart illustrating an example method 500 for performing joint pose estimation and shape completion of vehicle(s) in an autonomous vehicle's environment, using data obtained from one or more LIDAR systems, is shown. The determined shape and pose may be used for localization and navigation of an autonomous vehicle while respecting the geometric and temporal constraints of the environment.

At 502, the system may collect and/or receive sensor data (e.g., LIDAR data) corresponding to a perceived object in the environment of an autonomous vehicle. Such sensor data may be processed (504) to isolate parts of sensor data as point cloud data corresponding to individual perceived objects (e.g., using clustering, segmentation, etc.). Such isolated parts of sensor data may only include partial point cloud data corresponding to the perceived data and may need to be processed for estimating the shape and/or pose of the perceived individual objects. For example, a sensor may obtain the point data only for portions of a surface that are in the line of sight of the sensor (e.g., regions occluded by objects or other obstacles may not include any 3D points). Also, 3D points may be missing in the 3D point cloud because of sensor limitations of the mapping sensor and/or insufficient mapping.

Figure 5B:
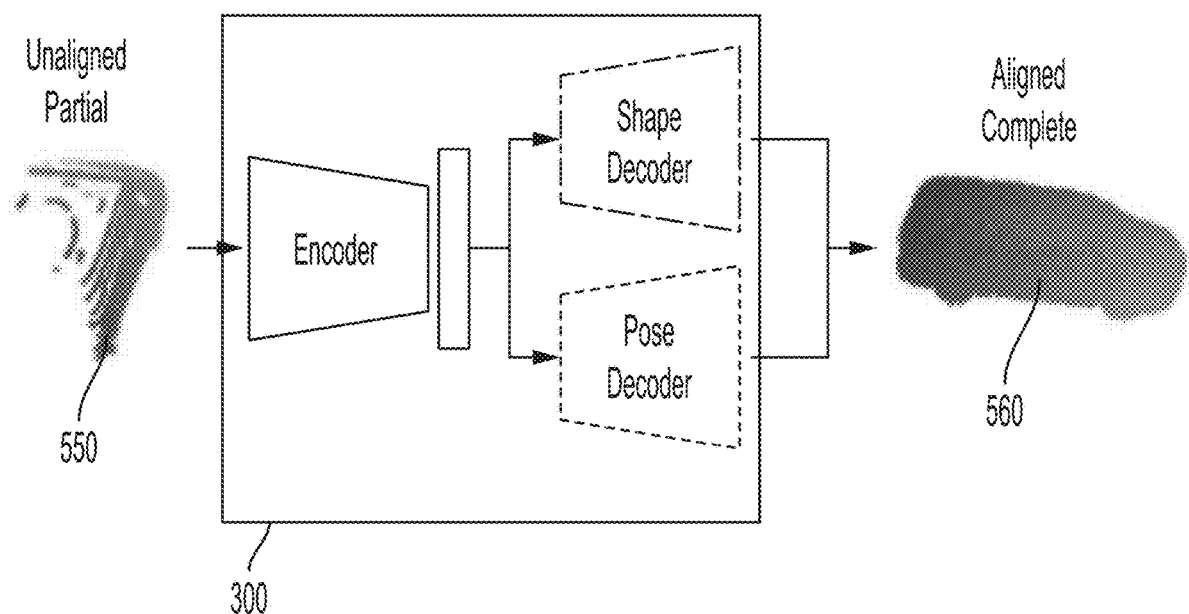
FIG. 5B is a schematic illustration of an example completed and aligned point cloud generated using a trained neural network.

At step 506, the point cloud data corresponding to individual objects may be used as input into a trained neural network (e.g., neural network 300 trained using the methods described in FIG. 4) to generate estimations (508) relating to the state of the perceived object. Such state estimations may include pose estimation and/or shape estimation. In certain embodiments, the estimated shape and pose of the perceived object may be used to predict a bounding box (e.g., an amodal bounding box) for the perceived object. A bounding box may be a 3-dimensional envelope, such as a cuboid, that surrounds the perceived object (shown, for example, in FIG. 6). It should be noted that the estimated shape may also be used for generating a complete point cloud (if not captured using the sensor) corresponding to the shape of the object. FIG. 5B schematically illustrates the process of inputting unaligned partial sensor data (e.g., point cloud) 550 corresponding to an individual perceived object into a trained neural network 300 (described above) to output an aligned complete point cloud 560.

Figure 6:
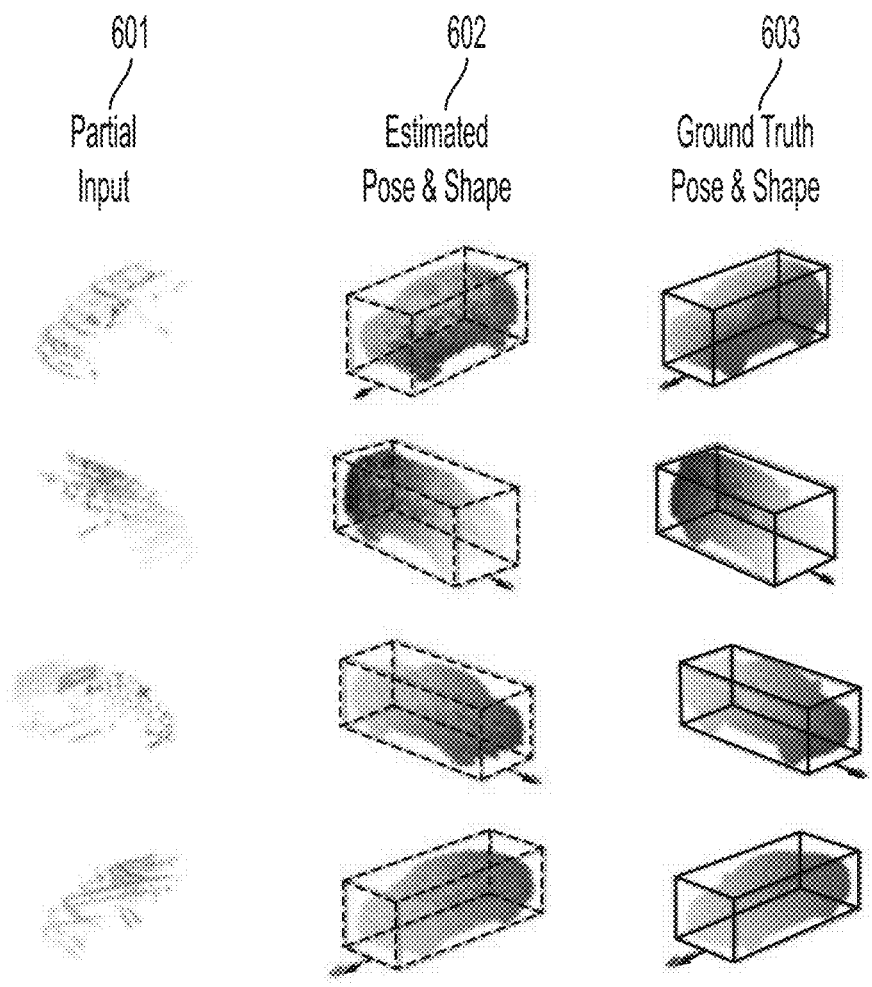
FIG. 6 illustrates example pose and shape estimates generated using a trained neural network.

FIG. 6 illustrates shape and pose estimates generated using the methods and systems of the current disclosure. As shown in FIG. 6, real world sensor data comprising partial or sparse LIDAR inputs (column 601) corresponding to point clouds of perceived objects are input into the trained neural network to generate the estimated pose and shapes (column 602). The ground truth pose and shape estimates are shown in column 603, and may serve as a reference for judging the accuracy of the estimated pose and shape of an object.

At 510, the system may use the estimated state information to navigate the vehicle in the environment (e.g., during tracking and motion planning). For example, the state of the perceived object may be used to predict the object's trajectory using any or hereafter known trajectory forecasting methods, and using the forecasted trajectory to control movements of the autonomous to avoid collision with the perceived object.

It should be noted that the systems and methods of this disclosure improve both the accuracy and efficiency of shape estimation and/or pose estimation based on sensor data, particularly when the sensor data is incomplete.

Figure 7:
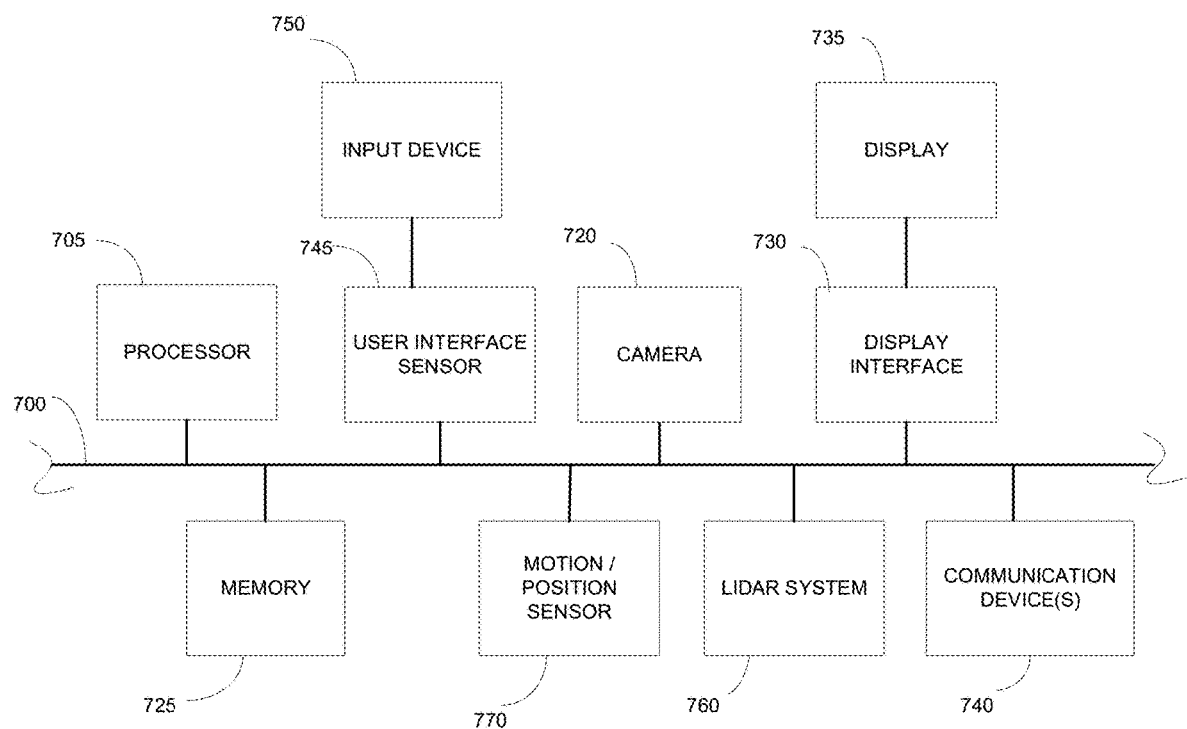
FIG. 7 is a block diagram of elements of a computing device on which the various systems and methods in this document could be implemented.

FIG. 7 depicts an example of internal hardware that may be included in any of the electronic components of the system, such as the controller (or components of the controller) of the autonomous vehicle, the control system, servers etc. described above. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 730 may permit information from the bus 700 to be displayed on a display device 735 in visual, graphic or alphanumeric format. An audio interface and audio output (such as a speaker) also may be provided. Communication with external devices may occur using various communication devices 740 such as a wireless antenna, an RFID tag and/or short-range or near-field communication transceiver, each of which may optionally communicatively connect with other components of the device via one or more communication system. The communication device(s) 740 may be configured to be communicatively connected to a communications network, such as the Internet, a local area network or a cellular telephone data network.

The hardware may also include a user interface sensor 745 that allows for receipt of data from input devices 750 such as a keyboard, a mouse, a joystick, a touchscreen, a touch pad, a remote control, a pointing device and/or microphone. Digital image frames also may be received from a camera 720 that can capture video and/or still images. The system also may receive data from a motion and/or position sensor 770 such as an accelerometer, gyroscope or inertial measurement unit. The system also may receive data from sensors such as LIDAR system 760 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

It should be noted that while the training of the neural network model and using the trained model in this disclosure is described with respect to autonomous vehicles and objects in the environments of the autonomous vehicles, the disclosure is not so limiting. The rolling horizon training methods described above may be used for training neural networks for use in other scenarios that are constrained by inertial parameters that represent short-term dynamics of an object. Examples may include neural network models configured for making predictions relating to movement of players and/or objects such as balls in a sports environment; or any other system or environment that is both constrained by physics and involves behavioral choice.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. A client device, server device, virtual machine or container may be referred to simply as a "device" for brevity.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft).

In this document, when terms such "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The invention claimed is:

1. A method comprising, by a processor:
    receiving point cloud data corresponding to an object, wherein the point cloud data is an incomplete point cloud representation of the object;
    accessing a non-transitory computer readable medium storing data defining a neural network which has been trained to jointly estimate a pose and a shape of the object of a plurality of objects from incomplete point cloud data, the neural network comprising a trained shared encoder neural network, a trained pose decoder neural network, and a trained shape decoder neural network, wherein the neural network was trained by freezing or predetermining one or more parameters associated with the trained shared encoder neural network and then using corresponding codes generated by the trained shared encoder neural network to train a pose decoder neural network;
    outputting, by the trained shared encoder neural network, a code representative of the point cloud data that can be used for estimating both the pose and the shape of the object;
    generating, by the trained pose decoder neural network, an estimated pose of the object based on the code, the estimated pose comprising at least a heading or a translation of the object; and
    generating, by the trained shape decoder neural network, an estimated shape of the object based on the code, the estimated shape comprising an estimated point cloud representation of the object that is denser than the incomplete point cloud representation of the object.

2. The method of claim 1, wherein:
    the point cloud data is collected by an autonomous vehicle during navigation; and
    the method further comprises:
        using the estimated shape and the estimated pose of the object to forecast a trajectory of the object in an environment of the autonomous vehicle; and
        causing, based on the forecasted trajectory, the autonomous vehicle to take an action to avoid colliding with the object.

3. The method of claim 1, further comprising using a LIDAR sensor to generate the point cloud data.

4. The method of claim 1, wherein the code is a lower dimensional representation of the point could data comprising a feature vector derived from the point cloud data.

5. The method of claim 1, wherein the trained shared encoder neural network comprises at least two deep network layers, each of the at least two deep network layers comprising a multilayer perceptron.

6. A method, by a processor:
    receiving point cloud data corresponding to an object, wherein the point cloud data is an incomplete point cloud representation of the object;
    accessing a non-transitory computer readable medium storing data defining a neural network which has been trained to jointly estimate a pose and a shape of the object of a plurality of objects from incomplete point cloud data, the neural network comprising a trained shared encoder neural network, a trained pose decoder neural network, and a trained shape decoder neural network;
    outputting, by the trained shared encoder neural network, a code representative of the point cloud data that can be used for estimating both the pose and the shape of the object;
    generating, by the trained pose decoder neural network, an estimated pose of the object based on the code, the estimated pose comprising at least a heading or a translation of the object; and
    generating, by the trained shape decoder neural network, an estimated shape of the object based on the code, the estimated shape comprising an estimated point cloud representation of the object that is denser than the incomplete point cloud representation of the object;
    wherein the neural network is trained to jointly estimating the pose and the shape of the object of the plurality of objects by:
        receiving training data comprising partial point cloud data and ground truth data corresponding to one or more objects;
        generating the trained shared encoder and the trained shape decoder neural network by using the training data to collectively train a shared encoder neural network and a shape decoder neural network, wherein the trained shared encoder neural network and the trained shared decoder neural network are trained to estimate the shape of the object of the plurality of objects;
        generating the trained pose decoder neural network by using one or more codes generated by the trained shared encoder neural network to train a pose decoder neural network while freezing one or more parameters associated with the trained shared encoder neural network; and
        outputting the neural network comprising the trained shared encoder neural network, the trained pose decoder neural network, and the trained shape decoder neural network.

7. The method of claim 6, wherein generating the trained shared encoder neural network and the trained shape decoder neural network further comprises freezing one or more parameters associated with the pose decoder neural network.

8. The method of claim 6, further comprising using a loss function to constrain training of the shared encoder neural network and the shape decoder neural network, wherein the loss function minimizes a distance between estimated shape completion and ground truth shape completion.

9. The method of claim 8, wherein the loss function comprises a Chamfer Distance loss function.

10. The method of claim 6, further comprising using a pose loss function to constrain training of the pose decoder neural network, wherein the pose loss function minimizes a distance between estimated point pose and ground truth pose.

11. The method of claim 6, further comprising fine-tuning the trained neural network by collectively training the trained shared encoder neural network, the trained shape decoder neural network, and the trained pose decoder neural network to generate an updated trained neural network, the collective training constrained by a joint loss function that includes a shape loss function and a pose loss function.

12. The method of claim 6, wherein the training data comprises synthetic data generated using simulation.

13. A system, comprising:
a processor; and
a non-transitory computer readable medium comprising:
data and program code collectively defining a neural network which has been trained to jointly estimate a pose and a shape of an object of a plurality of objects from incomplete point cloud data, the neural network comprising a trained shared encoder neural network, a trained pose decoder neural network, and a trained shape decoder neural network, wherein the neural network was trained by freezing or predetermining one or more parameters associated with the trained shared encoder neural network and then using corresponding codes generated by the trained shared encoder neural network to train a pose decoder neural network, and
one or more programming instructions that, when executed by the processor, cause the processor to:
receive point cloud data corresponding to the object, wherein the point cloud data is an incomplete point cloud representation of the object,
outputting, by the trained shared encoder neural network, a code representative of the point cloud data that can be used for estimating both the pose and the shape of the object,
generating, by the trained pose decoder neural network, an estimated pose of the object based on the code, the estimated pose comprising at least a heading or a translation of the object, and
generating, by the trained shape decoder neural network, an estimated shape of the object based on the code, the estimated shape comprising an estimated point cloud representation of the object that is denser than the incomplete point cloud representation of the object.

14. The system of claim 13, wherein:
the point cloud data is collected by an autonomous vehicle during navigation; and
the system further comprises programming instructions that, when executed by the processor, cause the processor to:
use the estimated shape and the estimated pose of the object to forecast a trajectory of the object in an environment of the autonomous vehicle, and
cause, based on the forecasted trajectory, the autonomous vehicle to take an action to avoid colliding with the object.

15. The system of claim 13, further comprising programming instructions that, when executed by the processor, cause the processor to use a LIDAR sensor to generate the point cloud data.

16. The system of claim 13, wherein the trained shared encoder neural network comprises at least two deep network layers, each of the at least two deep network layers comprising a multilayer perceptron.

17. A system, comprising:
a processor; and
a non-transitory computer readable medium comprising:
data and program code collectively defining a neural network which has been trained to jointly estimate a pose and a shape of an object of a plurality of objects from incomplete point cloud data, the neural network comprising a trained shared encoder neural network, a trained pose decoder neural network, and a trained shape decoder neural network, and
one or more programming instructions that when executed by the processor, cause the processor to:
receive point cloud data corresponding to the object, wherein the point cloud data is an incomplete point cloud representation of the object,
outputting, by the trained shared encoder neural network, a code representative of the point cloud data that can be used for estimating both the pose and the shape of the object,
generating, by the trained pose decoder neural network, an estimated pose of the object based on the code, the estimated pose comprising at least a heading or a translation of the object, and
generating, by the trained shape decoder neural network, an estimated shape of the object based on the code, the estimated shape comprising an estimated point cloud representation of the object that is denser than the incomplete point cloud representation of the object,
wherein the neural network is trained to jointly estimate the pose and the shape of the object by:
receiving training data comprising partial point cloud data and ground truth data corresponding to one or more objects;
generating the trained shared encoder neural network and the trained shape decoder neural network by using the training data to collectively train a shared encoder neural network and a shape decoder neural network, wherein the trained shared encoder neural network and the trained shared decoder neural network are trained to estimate the shape of the object of the plurality of objects;
generating a trained pose decoder by using one or more codes generated by the trained shared encoder neural network to train a pose decoder neural network while freezing one or more parameters associated with the trained shared encoder neural network; and
outputting the neural network comprising the trained shared encoder neural network, the trained pose decoder neural network, and the trained shape decoder neural network.

18. The system of claim 17, wherein generating the trained shared encoder neural network and the trained shape decoder neural network further comprises freezing one or more parameters associated with the pose decoder neural network.

19. The system of claim 17, further comprising programming instructions that, when executed by the processor, cause the processor to generate the neural network trained to jointly estimating the pose and the shape of the object of the plurality of objects by using a loss function to constrain training of the shared encoder neural network and the shape decoder neural network, wherein the loss function minimizes a distance between estimated shape completion and ground truth shape completion.

20. The system of claim 19, further comprising programming instructions that, when executed by the processor, cause the processor to generate the neural network trained to jointly estimating the pose and the shape of the object of the plurality of objects by using a pose loss function to constrain training of the pose decoder neural network, wherein the pose loss function minimizes a distance between estimated point pose and ground truth pose.

* * * * *